(12) United States Patent
Lee et al.

(10) Patent No.: US 9,054,395 B2
(45) Date of Patent: Jun. 9, 2015

(54) BATTERY PACK

(71) Applicant: Samsung SDI Co., Ltd., Yongin-si, Gyeonggi-do (KR)

(72) Inventors: Seong-Joon Lee, Yongin-si (KR); Woo-Jin Lee, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 131 days.

(21) Appl. No.: 13/828,128

(22) Filed: Mar. 14, 2013

(65) Prior Publication Data

US 2014/0037995 A1 Feb. 6, 2014

(30) Foreign Application Priority Data

Aug. 1, 2012 (KR) ........................ 10-2012-0084485

(51) Int. Cl.
*H01M 2/20* (2006.01)
*H01M 10/42* (2006.01)
*H01M 2/30* (2006.01)
*H01M 2/26* (2006.01)
*H01M 2/34* (2006.01)

(52) U.S. Cl.
CPC ............ *H01M 10/4257* (2013.01); *H01M 2/30* (2013.01); *H01M 2/26* (2013.01); *H01M 2/34* (2013.01); *H01M 2200/20* (2013.01)

(58) Field of Classification Search
None
See application file for complete search history.

(56) References Cited

U.S. PATENT DOCUMENTS

| | | |
|---|---|---|
| 2009/0176156 A1 | 7/2009 | Lee |
| 2010/0047687 A1 | 2/2010 | Lee et al. |
| 2011/0039130 A1 | 2/2011 | Baek et al. |
| 2011/0052941 A1 | 3/2011 | Jang et al. |
| 2011/0195281 A1 | 8/2011 | Jang |

FOREIGN PATENT DOCUMENTS

| | | |
|---|---|---|
| KR | 10-2009-0064069 | 6/2009 |
| KR | 10-0959872 | 5/2010 |
| KR | 10-2011-0024251 | 3/2011 |
| KR | 10-2011-0066774 | 6/2011 |

*Primary Examiner* — Patrick Ryan
*Assistant Examiner* — Wyatt McConnell
(74) *Attorney, Agent, or Firm* — Robert E. Bushnell, Esq.

(57) ABSTRACT

A battery pack having improved safety while implementing its small size and light weight. The battery pack includes an electrode assembly, a protective circuit module and an electrode tab. The electrode assembly has an electrode tab. The protective circuit module has a first surface and a second surface opposite to the first surface. In the protective circuit module, the first surface is positioned to face a surface to which the electrode tab of the electrode assembly is extended. The connection tab is positioned on the second surface of the protective circuit module so as to connect the electrode tab and the protective circuit module.

18 Claims, 8 Drawing Sheets

BATTERY PACK

CLAIM OF PRIORITY

This application makes reference to, incorporates the same herein, and claims all benefits accruing under 35 U.S.C. §119 from an application earlier filed in the Korean Intellectual Property Office on 1 Aug. 2012 and there duly assigned Serial No. 10-2012-0084485.

BACKGROUND OF THE INVENTION

1. Field of the Invention

An aspect of the present invention generally relates to a battery pack.

2. Description of the Related Art

Recently, battery packs have been variously used as power sources of potable electronic devices. As the portable electronic devices are used in various fields, demands on battery packs are rapidly increased. The battery packs can be charged/discharged a plurality of times, and accordingly are economically and environmentally efficient. Thus, the use of the battery packs is encouraged.

As the small size and light weight of electronic devices are required, the small size and light weight of battery packs are also required. However, since a material such as lithium having high reactivity is provided to the inside of the battery pack, the small size and light weight of the battery pack is limited due to the safety of the battery pack. Accordingly, a variety of studies have been conducted to develop a battery pack that can implement as a small and light battery pack while improving the safety of the battery pack.

The above information disclosed in this Related Art section is only for enhancement of understanding of the background of the invention and therefore it may contain information that does not form the prior art that is already known to a person of ordinary skill in the art.

SUMMARY OF THE INVENTION

Exemplary embodiments provide a battery pack which is small in size and light in weight using a new member.

Exemplary embodiments also provide a battery pack having improved safety.

According to an aspect of the present invention, there is provided a battery pack including: an electrode assembly having an electrode tab; a protective circuit module having a first surface and a second surface opposite to the first surface, wherein the first surface may be positioned to face a surface to which the electrode tab of the electrode assembly may be extended; and a connection tab positioned on the second surface of the protective circuit module so as to connect the electrode tab and the protective circuit module.

The connection tab may include a first tab portion positioned on the second surface of the protective circuit module; a second tab portion extended from the first tab portion so as to be bent toward the first tab portion; and a third tab portion extended from the second tab portion so as to be bent toward the second tab portion. In the connection tab, at least a portion of the electrode tab may be positioned between the second and third tab portions.

The bending direction of the second tab portion and the bending direction of the third tab portion may be vertical to each other.

The first, second and third tab portions may have the shape of a rectangular flat plate having long and short sides.

The first and second tab portions may be connected to each other at the long side, and the second and third tab portions may be connected to each other at the short side.

The sizes of the first, second and third tab portions may be equal to one another.

The electrode tab may include a first region extended from the electrode assembly; a second region bent from the first region so that at least a portion of the second region may be positioned on the third tab portion; a third region bent from the second region so as to be positioned on a side corner of the third tab portion; and a fourth region bent from the third region so that at least a portion of the fourth region may be positioned between the second and third tab portions.

The space between the fourth region of the electrode tab and the electrode assembly may correspond to the thickness of the protective circuit module.

The connection tab may include nickel.

The electrode assembly may include a first electrode plate; a second electrode plate; a separator interposed between the first and second electrode plates; and the electrode tab having first and second electrode tabs respectively connected to the first and second electrode plates.

The battery pack may further include a battery case that accommodates the electrode assembly. In the battery case, a sealing portion may be provided at an edge of the battery case.

The battery case may include a first sub-case and a second sub-case, an accommodating portion that accommodating the electrode assembly is provided to the first sub-case, and the second sub-case covers the first sub-case.

The electrode tab may be extracted through the sealing portion. The electrode tab may be bent so as to face the accommodating portion of the first sub-case at an end of the sealing portion.

The first surface of the protective circuit module may face the accommodating portion of the first sub-case.

The electrode tab may be provided with a film, and the film may be provided to be mounted on the sealing portion.

According to another aspect of the present invention, there is provided a manufacturing method of a battery pack including: connecting a connection tab positioned on a second surface of a protective module to an electrode tab provided to an electrode assembly, wherein the protective circuit module has a first surface and the second surface opposite to the first surface; placing the protective circuit module so that the first surface of the protective circuit module faces a surface to which the electrode tab of the electrode assembly may be extended.

The connection tab may include a first tab portion positioned on the second surface of the protective circuit module; a second tab portion extended from the first tab portion; and a third tab portion extended from the second tab portion.

The connecting of the connection tab to the electrode tab may include placing the electrode tab on the second tab portion of the connection tab; bending the third tab portion in the direction of the second tab portion so that at least a portion of the electrode tab may be positioned between the second and third tab portions; and rotating the protective circuit module in a first direction so that the first tab portion may be bent toward the second tab portion.

In the placing of the protective circuit module, the first surface may be face the surface to which the electrode tab of the electrode assembly may be extended by rotating the protective circuit module in a second direction opposite to the first direction.

The placing of the protective circuit module may include bending the electrode tab twice by rotating the protective circuit module in the second direction opposite to the first direction, and bending the electrode assembly once more by rotating the protective circuit module in the second direction so that the first surface of the protective circuit module faces the surface to which the electrode tab of the electrode assembly may be extended.

These and other features and advantages of the present invention will be set forth or will become more fully apparent in the description that follows.

Prior to the foregoing, terms and words used in this specification or claims shall not be interpreted as typical or dictionary meanings, but shall be interpreted as meanings and concepts complying with the technical spirit of the present invention in accordance with the principle that the inventor may properly define the concept of the terms to explain his/her invention by the best method.

As described above, according to the present invention, the battery pack includes the connection portion that connects the electrode tab and the protective circuit module, so that it is possible to implement the small size and light weight of the battery pack.

Further, it is possible to improve the safety of the battery pack.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
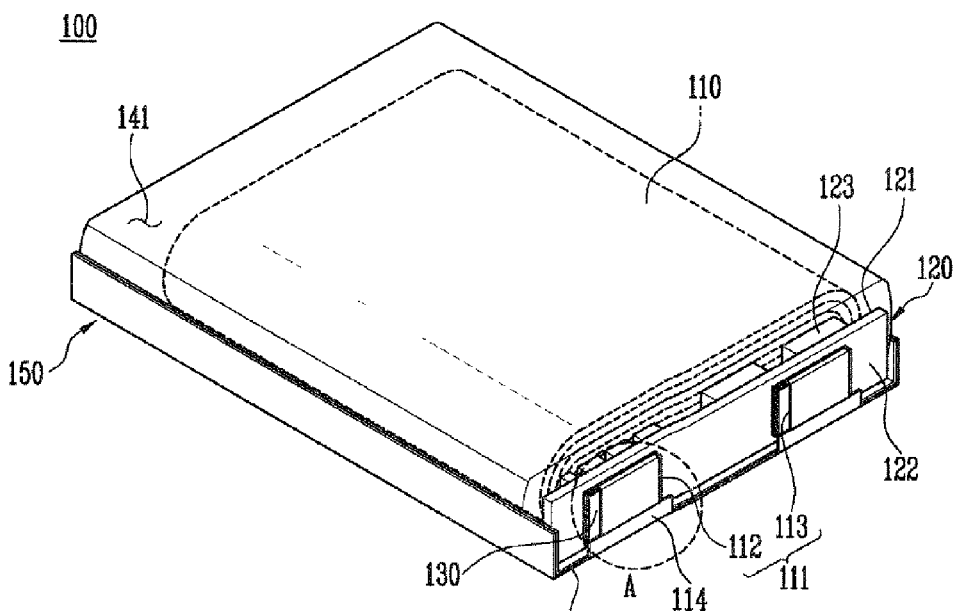
FIG. 1 is a perspective view of a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

Figure 2:
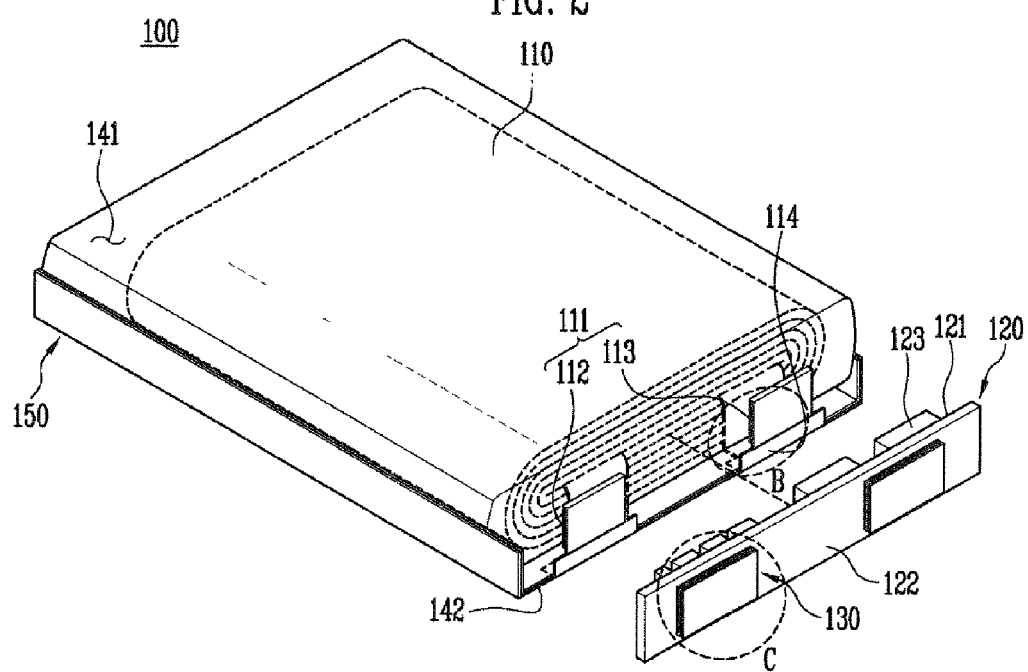
FIG. 2 is an exploded perspective view of the battery pack shown in FIG. 1.

FIG. 1 is a perspective view of a battery pack 100 according to an embodiment of the present invention. FIG. 2 is an exploded perspective view of the battery pack 100 shown in FIG. 1. Hereinafter, the battery pack 100 according to this embodiment will be described with reference to FIGS. 1 and 2.

As shown in FIGS. 1 and 2, the battery pack 100 according to this exemplary embodiment includes an electrode assembly 110 having an electrode tab 111, a protective circuit module 120 of which first surface 121 may be positioned to face a surface formed by extending the electrode tab 111 of the electrode assembly 110, and a connection tab 130 that connects between the electrode assembly 110 and the protective circuit module 120. The connection tab 130 has a structure in which the electrode tab 111 may be coupled to a second surface 122 opposite to the first surface 121 of the protective circuit module 120 so that it is possible to improve the safety of the battery pack 100 and to implement the small size and light weight of the battery pack 100.

The electrode assembly 110 is a member that has the electrode tab 111 formed at one side thereof. The electrode assembly 110 constitutes a bare cell 150 together with a battery case 140 (see FIG. 8) so as to generate electrochemical energy through the movement of ions or electrons.

Here, the electrode assembly 110 may include a first electrode plate, a second electrode plate, a separator interposed between the first and second electrode plates, and the electrode tab 111 composed of first and second electrode tabs 112 and 113 extracted to the outside of the electrode assembly 110. Here, the first and second electrode plates may include positive and negative electrode plates, respectively, and the first and second electrode tabs 112 and 113 may include positive and negative electrode tabs, respectively. The electrode tab 111 may be extracted to the outside from the one side of the electrode assembly 110 so as to transfer the electrochemical energy generated in the bare cell 150 to the outside of the electrode assembly 110. The electrode assembly 110 may be manufactured using various methods of winding or stacking the first electrode plate, the second electrode plate and the separator, and the like. In the present invention, it will be apparent that the electrode assembly 110 may include all types of electrode assemblies such as a stacking-type electrode assembly and a winding-type electrode assembly.

The protective circuit module 120 is a member that controls voltage or current in charging/discharging of the bare cell 150. The protective circuit module 120 may include the first surface 121 and the second surface 122 opposite to the first surface.

Here, the first surface 121 of the protective circuit module 120 may be positioned to face the surface formed by extending the electrode tab 111 of the electrode assembly 110. Thus, the unnecessary space between the protective circuit module 120 and the electrode assembly 110 is removed. Accordingly, it is possible to implement the small size and light weight of the battery pack 100.

The protective circuit module 120 may be connected to the electrode tab 111 through the connection tab 130 on the second surface 122 rather than on the first surface 121 close to the electrode assembly 110. Therefore, the electrode tab 111 may be entirely formed to cover a lower side corner of the protective circuit module 120. Accordingly, since the coupling force between the electrode assembly 110 and the protective circuit module 120 can be relatively increased, the battery pack 100 can be more stably implemented as compared with the conventional battery pack.

Meanwhile, the protective circuit module 120 may be implemented as a circuit board having a circuit pattern formed therein, and a plurality of electronic components 123 may be mounted on the first surface 121 of the protective circuit module 120. Here, the electronic components 123 may be a field effect transistor (FET), an integrated circuit (IC), a positive temperature coefficient (PTC), and the like. The electronic components 123 may perform a function of controlling the electrode assembly 110 in the bare cell 150 or cutting off the circuit in an abnormal operation of the electrode assembly 120. The circuit board of the protective circuit module 120 includes a switching circuit so as to more efficiently control or protect, together with the electronic components 123, the battery pack 100. Specifically, the protective circuit module 120 can prevent the explosion, overheating and leakage of the battery pack 100 and the deterioration of charging/discharging characteristics by blocking overcharging, overdischarging, over current, short circuit and reverse voltage of the battery pack. Further, the protective circuit module 120 can remove risk factors and extend the lifetime of the battery pack by prevent the degradation of electrical performance and the abnormal operation.

The connection tab 130 is a member that connects the electrode tab 111 of the electrode assembly 110 and the protective circuit module 120 to each other. The connection tab 130 may be positioned on the second surface 122 of the protective circuit module 120.

Here, the connection tab 130 may be positioned on the second surface 122 of the protective circuit module 120, and the second surface 122 may be positioned opposite to the first surface 121. Therefore, the connection tab 130 may be exposed to the outside. The connection tab 130 may have a configuration in which three tab portions 130a, 130b and 130c are bent and overlapped with one another. The configuration of the connection tab 130 will be described later in detail with reference to FIG. 5.

Figure 3:
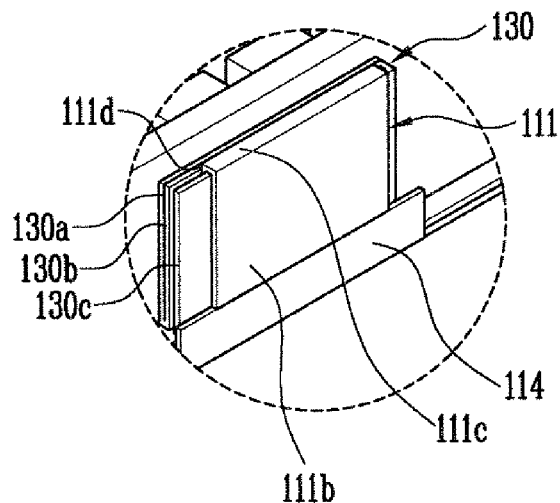
FIG. 3 is an enlarged view of portion 'A' shown in FIG. 1.
Figure 4:
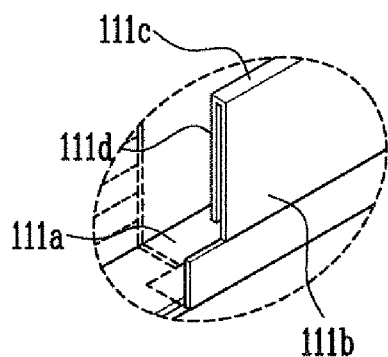
FIG. 4 is an enlarged view of portion 'B' shown in FIG. 2.

FIG. 3 is an enlarged view of portion 'A' shown in FIG. 1. FIG. 4 is an enlarged view of portion 'B' shown in FIG. 1. Hereinafter, the shape of the electrode tab 111 provided to the electrode assembly 110 will be described in detail with reference to FIGS. 3 and 4.

As shown in FIGS. 3 and 4, the electrode tab 111 may be divided into a first region 111a, a second region 111b, a third region 111c and a fourth region 111d through the shape at which the electrode assembly 111 are bent at least three times. Here, the first region 111a may be a region extracted toward the protective circuit module 120 from the electrode assembly 110, and the second region 111b may be a region bent from the first region 111a. The third region 111c may be a region bent from the second region 111b, and the fourth region 111d may be a region again bent from the third region 111c. In this case, the second, third and fourth regions 111b, 111c and 111d may be bent vertically from the first, second and third regions 111a, 111b and 111c, respectively. However, in this specification, the term 'vertical' does not mean complete 90 degrees, and will be a concept including a mechanical tolerance and a portion rounded at a bent place. Meanwhile, the electrode tab 111 is not necessarily bent, but may be implemented by appropriately combining straight or curve lines.

Figure 5:
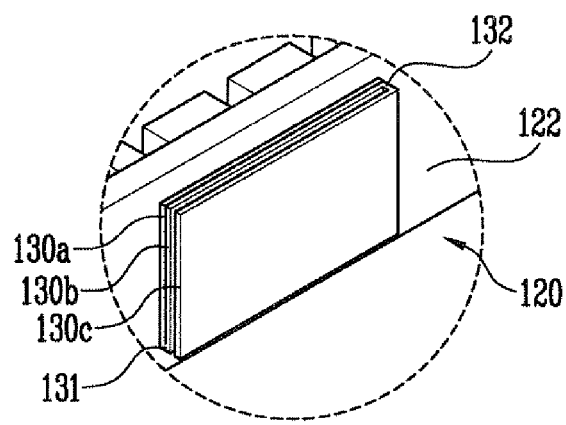
FIG. 5 is an enlarged view of portion 'C' shown in FIG. 2.

FIG. 5 is an enlarged view of portion 'C' shown in FIG. 1. Hereinafter, the configuration of the connection tab 130 will be described in detail with reference to FIG. 5.

As shown in FIG. 5, the connection tab 130 is a member that may be positioned on the second surface 122 of the protective circuit module 120 so as to connect the electrode tab 111 and the protective circuit module 120 to each other. The connection tab 130 may include the first tab portion 130a, the second tab portion 130b and the third tab portion 130c. Here, the first tab portion 130a may be positioned horizontally with the second surface 122 of the protective circuit module 120 on the second surface 122 of the protective circuit module 120, and the second tab portion 130b may be extended from the first tab portion 130a so as to be bent toward the first tab portion 130a. The third tab portion 130c may be extended from the second tab portion 130b so as to be again bent toward the second tab portion 130b. In this case, the bending direction of the second tab portion 130b and the bending direction of the third tab portion 130c are not horizontal and vertical to each other. Specifically, as shown in FIG. 5, a bending line 131 between the first and second tab portions 130a and 130b may be vertical to a bending line 132 between the second and third tab portions 130b and 130c. This can be seen in detail through the shape before the connection tab 130 is bent in FIG. 6.

Meanwhile, the sizes of the first, second and third tab portions 130a, 130b and 130c may be equal to one another. Accordingly, if both the second and third tab portions 130b and 130c are bent, only the third tab portion 130c may be exposed to the outside when viewed from the second surface 122 of the protective circuit module 120. Thus, the external appearance of the battery pack 100 can be entirely smart, and it is possible to prevent, in advance, an abnormal operation such as an electrical short circuit, caused by the exposed portions of the first and second tab portions 130a and 130b.

The connection tab 130 may be made of metal such as nickel having excellent electrical conductivity. The first tab portion 130a may be connected to the circuit pattern of the protective circuit module 120 so that the entire connection tab 130 can be electrically connected.

Figure 6:
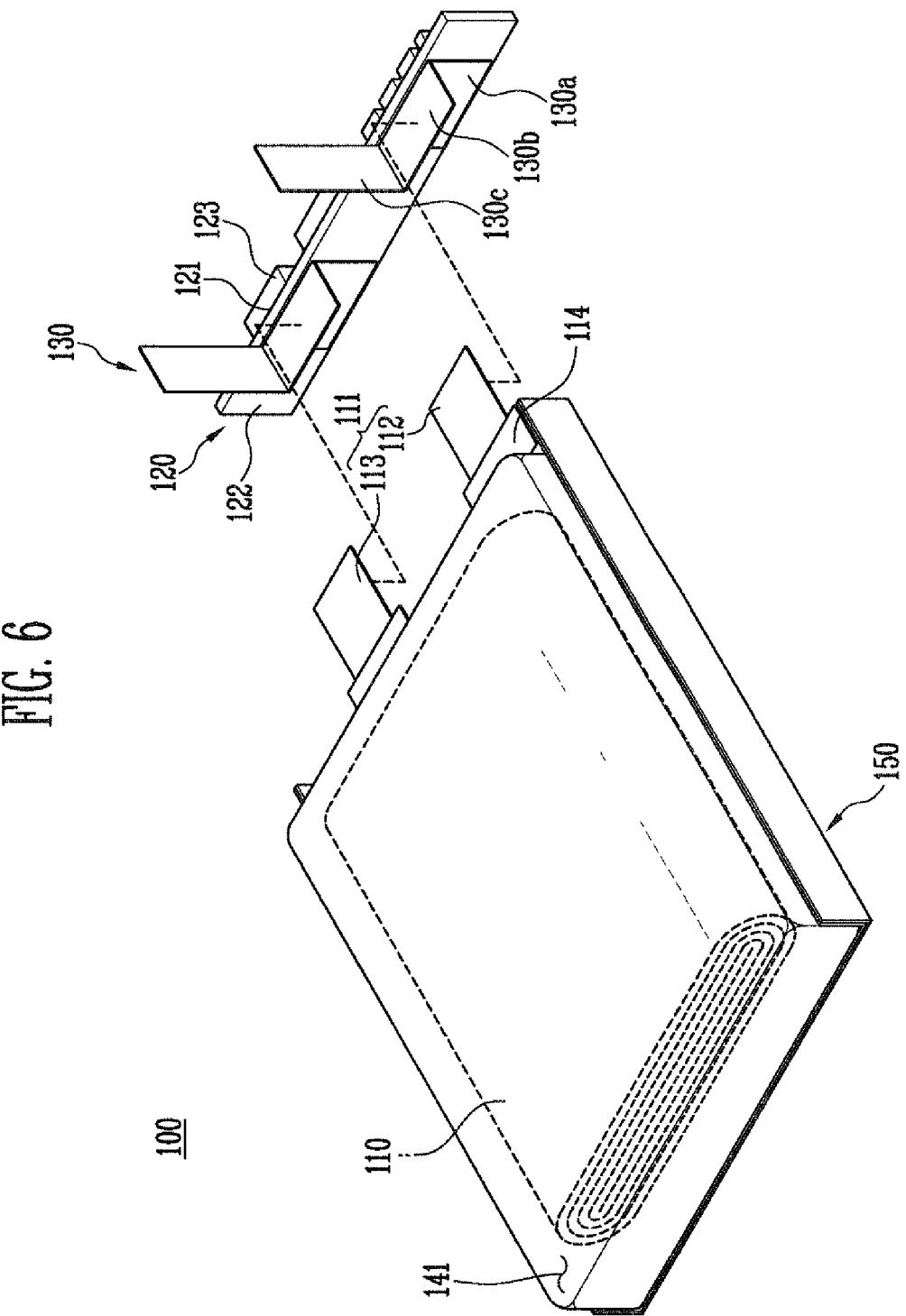
FIG. 6 is a perspective view showing an initial state before a bare cell and a protective circuit module in the battery pack shown in FIG. 1 are coupled to each other.

FIG. 6 is a perspective view showing an initial state before the bare cell 150 and the protective circuit module 120 in the battery pack 100 shown in FIG. 1 are coupled to each other. Hereinafter, the configuration of the connection tab 130 according to this embodiment will be described in a more detailed manner with reference to FIG. 6.

As shown in FIG. 6, in the initial state before the bare cell 150 and the protective circuit module 120 are coupled to each other, the first, second and third tab portions 130a, 130b and 130c of the connection tab 130 are merely connected to one another, but are not bent toward one another, unlike the final state shown in FIG. 1. Specifically, the first tab portion 130a may be positioned on the second surface 122 of the protective circuit module 120, like in the final state, and the second tab portion 130b may be extended from the first tab portion 130a so as to be positioned vertical to the first tab portion 130a at about 90 degrees. The third tab portion 130c may be extended from the second tab portion 130b so as to be positioned vertical to the second tab portion 130b at about 90 degrees. If the coupling between the bare cell 150 and the protective circuit module 120 is completed from the initial position, the second tab portion 130b may be bent toward the first tab portion 130a so as to be overlapped with the first tab portion 130a, and the third tab portion 130c may be bent toward the second tab portion 130b so as to be overlapped with the second tab portion 130b. Accordingly, the first, second and third tab portions 130a, 130b and 130c can form the shape of the connection tab 130 in the final state shown in FIG. 1.

Meanwhile, the first, second and third tab portions 130a, 130b and 130c may be implemented in the shape of a rectangular flat plate having long and short sides, and the sizes of the first, second and third tab portions 130a, 130b and 130c are equal to one another. The long side of the second tab portion 130b may be extended from the first tab portion 130a, and the short side of the third tab portion 130c may be extended from the second tab portion 130b. The first, second and third tab portions 130a, 130b and 130c may be integrally formed to constitute the connection tab 130.

Figure 7:
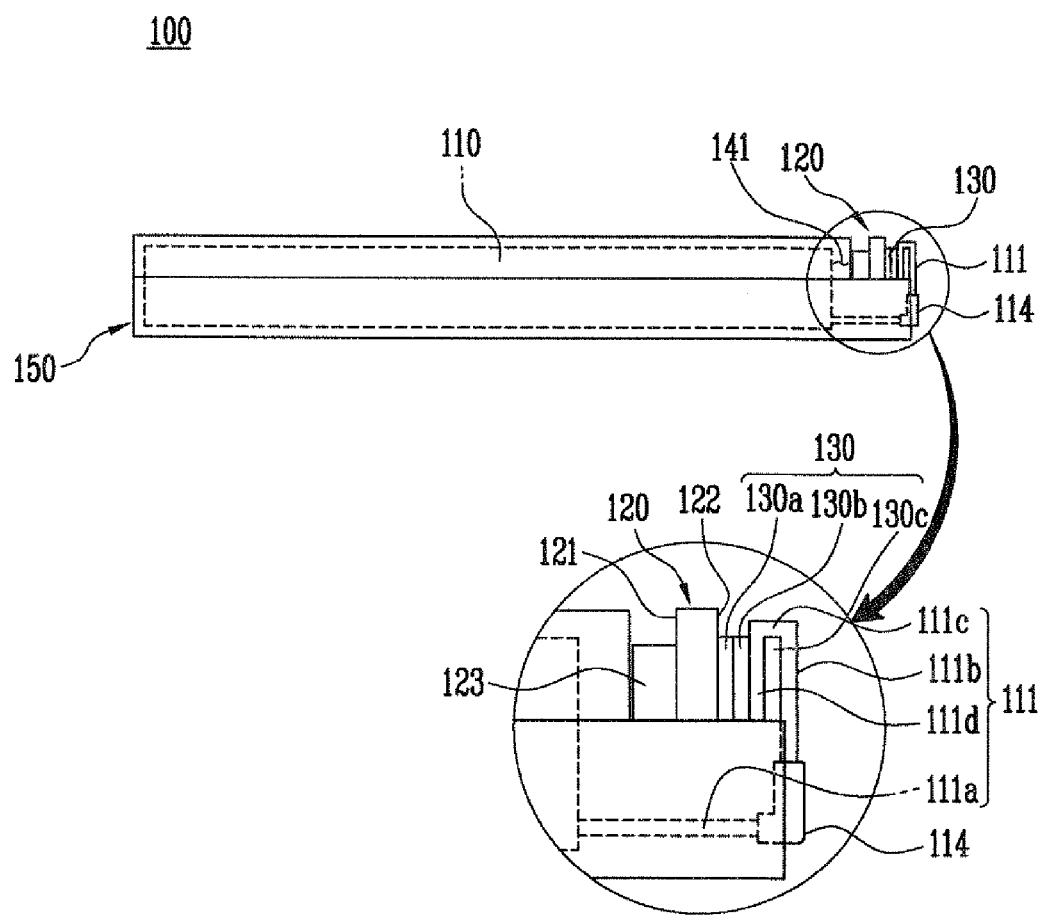
FIG. 7 is a side view of the battery pack shown in FIG. 1.

FIG. 7 is a side view of the battery pack 100 shown in FIG. 1. Hereinafter, the connection relationship between the electrode tab 111 of the electrode assembly 110 and the connection tab 130 will be described with reference to FIG. 7.

As shown in FIG. 7, the electrode tab 111 of the electrode assembly 110 may be connected to the protective circuit module 120 through the connection tab 130. Specifically, the first region 111a of the electrode tab 111 may be extended from the electrode tab 110, and the second region 111b of the electrode tab 111 may be bent from the first region 111a so that at least a portion of the second region 111b may be positioned on the third tab portion 130c of the connection tab 130. Accordingly, the second region 111b of the electrode tab 111 can be exposed to the outside. The third region 111c of the electrode tab 111 may be bent from the second region 111b so as to be positioned on one side corner of the third tab portion 130c, and the fourth region 111d of the electrode tab 111 may be bent from the third region 111c so that at least a portion of the fourth region 111d may be positioned between the second and third tab portions 130b and 130c. As a result, the second, third and fourth regions 111b, 111c and 111d of the electrode tab 111 may be implemented in the shape that surround the one side corner of the third tab portion 130c of the connection tab 130. In a case where the thickness of the third tab portion 130c is very thin, the width of the third region 111c is also very short, and therefore, the third region 111c may be omitted.

Meanwhile, the electrical connection between the electrode tab 111 and the connection tab 130 may be implemented through a first connection portion between the second region 111b of the electrode tab 111 and the third tab portion 130c of the connection tab 130, a second connection portion between the fourth region 111d of the electrode tab 111 and the second tab portion 130b of the connection tab 130, and a third connection portion between the fourth region 111d of the electrode tab 111 and the third tab portion 130c of the connection tab 130. Conventionally, there was a problem in that since the connection between the electrode tab and the connection tab was implemented through only any one of the connection portions, the electrical connection between the bare cell and the protective circuit module was disconnected when the connection portion between the electrode tab and the connection tab was disconnected. However, the battery pack 100 according to this embodiment has three connection portions, so as to be more stably implemented. The implementation of the three connection portions as described above is based on a specific configuration of the connection tab 130 having the first, second and third tab portions 130a, 130b and 130c. Here, the configuration of the electrode tab 111 is not necessarily a configuration in which the electrode tab 111 may be bent. If at least a portion of the electrode tab 111 may be positioned between the second and third tab portions 130b and 130c of the connection tab 130 even though the electrode tab 111 has a combination of curve or straight lines, the implementation of the present invention is possible.

In this case, the connection of each connection portion may be performed, for example, through laser welding, soldering or the like. The welding or soldering may be applied to the entire connection portion or may be applied to only a portion of the connection portion. Meanwhile, the first, second and third connection portions are not necessarily 'attached' through the welding, soldering or the like. Specifically, since the third tab portion 130c of the connection tab 130 may be surrounded by the second, third and fourth regions 111b, 111c and 111d of the electrode tab 111, movements of the protective circuit module 120 connected to the connection tab 130 in the direction distant from the electrode assembly 110, the direction moved to the upper portion of the electrode assembly 110 and the direction close to the electrode assembly 110 may be limited. Since the lower corners of the protective circuit module 120 are surrounded by the first region 111a of the electrode tab 111, the movement of the protective circuit module 120 in the lower portion of the electrode assembly 110 may also be limited. As a result, although the first, second and third connection portions are not necessarily 'attached,' the movements of the protective circuit module 120 in all the directions may be limited due to the specific configuration of the electrode tab 111 and the connection tab 130. Therefore, the 'attachment' process such as soldering or welding is not necessarily required.

Meanwhile, the protective circuit module 120 may be positioned in a space between the fourth region 111d of the electrode tab 111 and the surface of the electrode assembly 110, to which the electrode tab 111 may be extended. Therefore, the space is preferably provided to correspond to the thickness of the protective circuit module 120. However, the present invention is not limited thereto, and the space may be implemented greater than the thickness of the protective circuit module 120.

Figure 8:
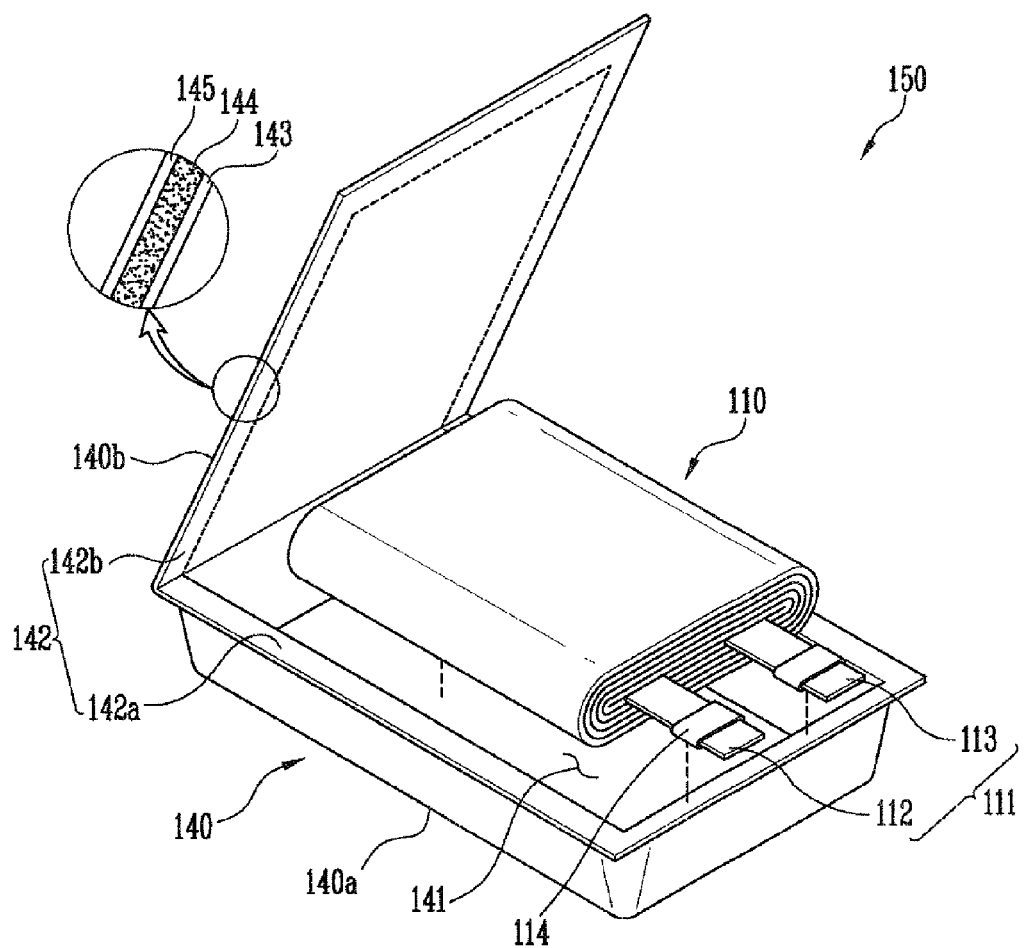
FIG. 8 is an exploded perspective view of the bare cell of the battery pack shown in FIG. 1.

FIG. 8 is an exploded perspective view of the bare cell 150 of the battery pack 100 shown in FIG. 1. Hereinafter, an exemplary configuration of the bare cell 150 according to this embodiment will be described with reference to FIG. 8.

As shown in FIG. 8, the bare cell 150 may be implemented as a pouch-type bare cell by further including the battery case 140 together with the electrode assembly 110. Here, the battery case 140 is a member that encapsulates the electrode assembly 110, and may be composed of a first sub-case 140a and a second sub-case 140b. In this case, an accommodating portion 141 that accommodates the electrode assembly 110 is provided to the first sub-case 140a, and the second sub-case 140b may be implemented to cover the first sub-case 140a. Therefore, the accommodating portion 141 of the first sub-case 140a may be provided to correspond to the shape and size of the electrode assembly 110. For example, the accommodating portion 141 may be manufactured through a deep drawing process of producing a hollow container having no joint from a flat plate. The bare cell 150 may be manufactured by accommodating the electrode assembly 110 and an electrolyte in the accommodating portion 141 of the first sub-case 140a, and forming a sealing portion 142 through thermal fusion of edges 142a and 142b of the first and second sub-cases 140a and 140b in the state in which the first and second sub-cases 140a and 140b are adhered closely to each other.

In this case, the electrode tab 111 of the electrode assembly 110 may be extracted through the sealing portion 142, and the second region 111b of the electrode tab 111 may be bent to face the accommodating portion 141 of the first sub-case 140a at an end of the sealing portion 142. The first region 111a of the electrode tab 111 may not be exposed to the outside by the sealing portion 142 of the battery case 140. In a case where the battery case 140 is further included in the bare cell 150, the first surface of the protective circuit module 120 does not directly face the electrode assembly 110 but faces the accommodating portion 141 of the first sub-case 140a, so that the protective circuit module 120 may be mounted on the sealing portion 142 (see FIG. 1).

Meanwhile, as shown in FIG. 8, the battery case 140 may include an inner resin layer 143, a metal layer 144 and an outer resin layer 145, which are sequentially laminated. Here, the inner resin layer 143 may be a portion that directly faces the electrode assembly 110, and the outer resin layer 145 may be a portion corresponding to the outermost surface of the battery case 140. The inner and outer resin layers 143 and 145 may be made of a polymer resin or the like which may be a nonconductor in order to prevent a short circuit, or the like. The metal layer 144 may be provided between the inner and outer resin layers 143 and 145 so as to provide a predetermined mechanical strength, and may include, for example, aluminum. The first electrode tab 112 may be configured to include aluminum, and the second electrode tab 113 may be configured to include nickel. Here, the first electrode tab 112 may be made of the same metal as the metal layer 144 so as to have the same polarity, and the second electrode tab 113 may have a polarity opposite to that of the first electrode tab 112. In this case, the electrode tab 111 contacts the metal layer 144 exposed at the end of the sealing portion 142, and therefore, an electrical short circuit may occur. Particularly, since the polarity of the second electrode tab 113 may be different from that of the metal layer 144, attention should be paid so that a short circuit between the second electrode tab 113 and the metal layer 114 does not occur.

In order to prevent such a phenomenon, a film 114 may be further provided to the electrode tab 111 according to this embodiment. Here, the film 114 may be provided to be mounted on the sealing portion 142, and may be made of a nonconductor so as to prevent a short circuit between the electrode tab 111 and the metal layer 144. The film 114 may be made of a material similar to the sealing portion 142 so as to help the sealing portion 142 be completely thermally fused therewith. Accordingly, the electrode tab 111 made of the metal can be completely adhered to the sealing portion 142. As a result, the sealing performance of the battery case 140 can be reinforced by the film 114. In addition, the film 114 may be bent along the bending of the second region 111b of the electrode tab 111.

Meanwhile, although it has been described in this embodiment that the bare cell 150 is implemented as a pouch-type bare cell, the present invention is not limited thereto. That is, the bare cell 150 may be implemented as various types of bare cells such as a prism-type bare cell.

Figure 9:
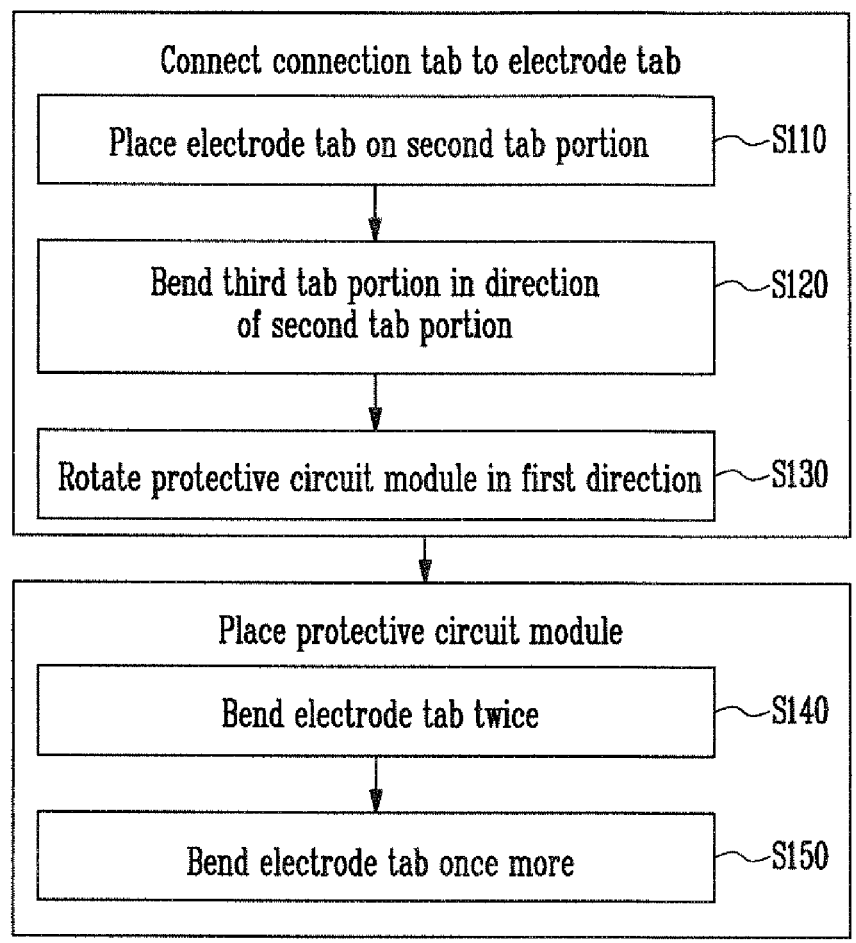
FIG. 9 is a flowchart illustrating a manufacturing method of the battery pack shown in FIG. 1.

FIG. 9 is a flowchart illustrating a manufacturing method of the battery pack 100 shown in FIG. 1. FIGS. 10 to 14 are side views illustrating the manufacturing method of the battery pack 100 shown in FIG. 1. Hereinafter, the manufacturing method of the battery pack 100 according to this embodiment will be described with reference to FIGS. 9 to 14.

Figure 10:
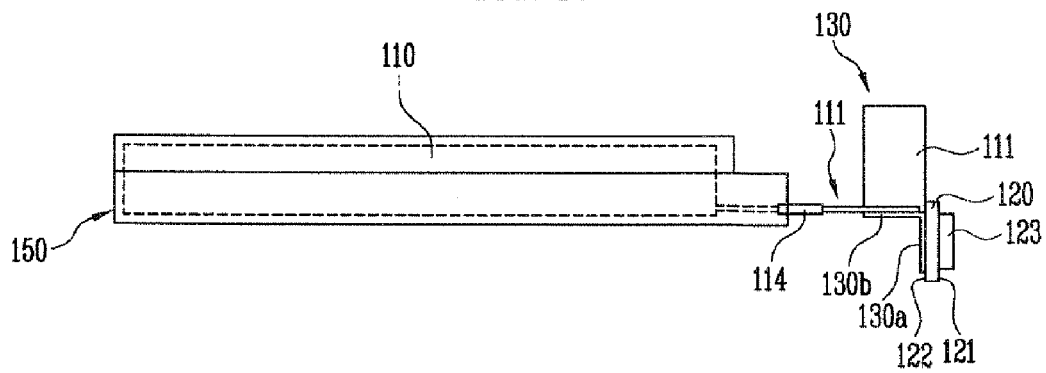
FIGS. 10 to 14 are side views illustrating the manufacturing method of the battery pack shown in FIG. 1.

First, as shown in FIG. 10, the electrode tab 111 of the electrode assembly 110 may be placed on the second tab portion 130b of the connection tab 130 positioned on the second surface 122 of the protective circuit module 120 (S110).

In this case, the second tab portion 130b may be extended from the first tab portion 130a, and may be, for example, in a state in which the second tab portion 130b may be vertically bent from the first tab portion 130a. The protective circuit module 120 may be in a state in which the second surface 122 may be vertically erected vertically with respect to the bare cell 150 so as to face the bare cell 150.

Meanwhile, the electrode tab 111 may be connected on the second tab portion 130b through laser welding, soldering or the like. In this embodiment, the various kinds of electrode components 123 can be effectively protected due to the specific structure of the connection tab 130. Conventionally, the connection portion of the electrode tab was positioned adjacent on the protective circuit module, and therefore, the electrode components of the protective circuit module were damaged by pressure or heat during laser welding or soldering. However, in the manufacturing method of the battery pack 100 according to this embodiment, the second tab portion 130b is not directly positioned on the protective circuit module 120 but positioned to be spaced apart from the protective circuit module 120 while being bent at about 90 degrees. Thus, the damage of the electronic components 123, caused by pressure or heat during welding or soldering can be relatively reduced.

Figure 11:
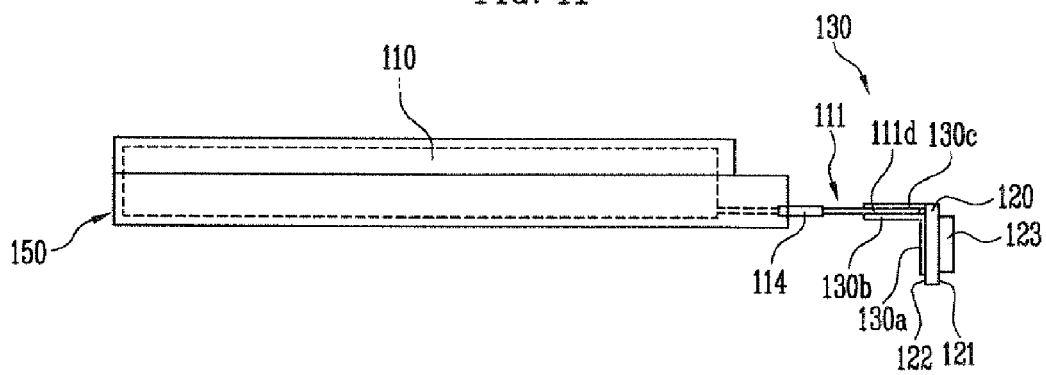

Next, as shown in FIG. 11, the third tab portion 130c of the connection tab 130 may be bent in the direction of the second tab portion 130b (S120).

In this case, the third tab portion 130c may be formed in the shape in which the third tab portion 130c may be overlapped on the second tab portion 130b, and a portion of the electrode tab 111, i.e., the fourth region 111d of the electrode tab 111 may be positioned between the second and third tab portions 130b and 130c. Here, the third tab portion 130c and the electrode tab 111 may be connected through welding, soldering or the like.

Figure 12:
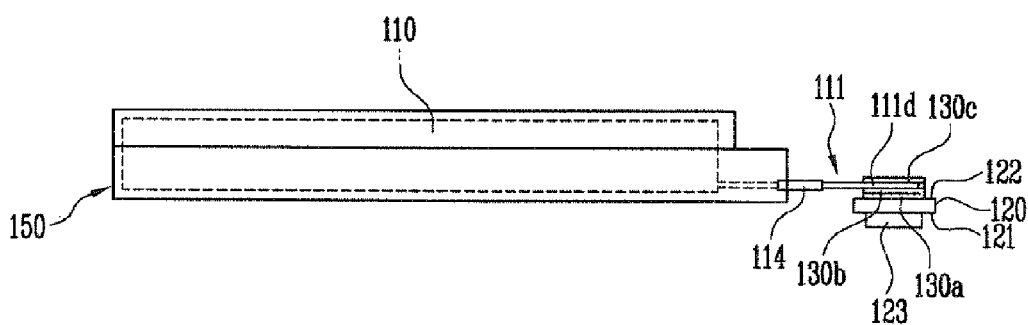

Next, as shown in FIG. 12, the protective circuit module 120 may be rotated to about 90 degrees (¼ cycle) in a first direction so that the first tab portion 130a of the connection tab 130 may be bent toward the second tab portion 130b (S130).

In this case, the second tab portion 130b may be formed in the shape in which the second tab portion 130b may be overlapped on the first tab portion 130a, and the protective circuit module 120 may be in a state in which the protective circuit module may be horizontally spaced apart from the bare cell 150 due to the rotation thereof. Meanwhile, the processes of FIGS. 10 to 12 correspond to a step of connecting the electrode tab 110 and the connection tab 130.

Figure 13:
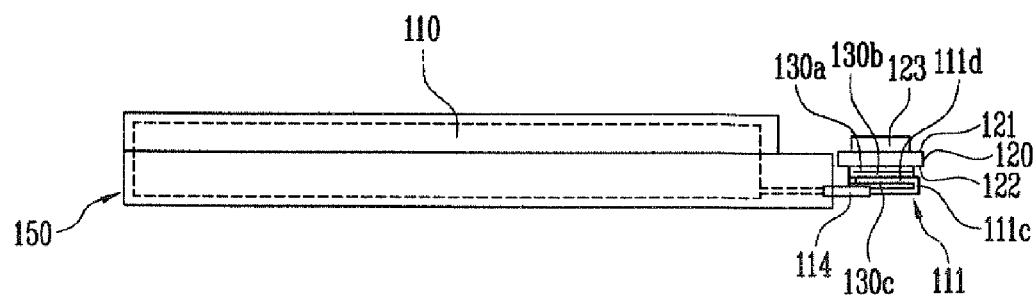

Next, as shown in FIG. 13, the electrode tab 111 may be bent twice by rotating the protective circuit module 120 to about 180 degrees (½ cycle) in a second direction opposite to the first direction (S140).

In this case, the electrode tab 111 may be bent twice to be divided into the fourth region 111d of which at least a portion may be positioned between the second and third tab portions 130b and 130c, the third region 111c positioned at the side corner of the third tab portion 130c, and a region obtained by combining the first and second regions 111a and 111b which have not been bent yet. Meanwhile, in this state, the third tab portion 130c of the connection tab 130 may come in contact with the second region 111b of the electrode tab 111, which has not been bent yet. The third tab portion 130 and the second region 111b are welded or soldered to each other, so that their coupling performance and safety can be more improved.

Figure 14:
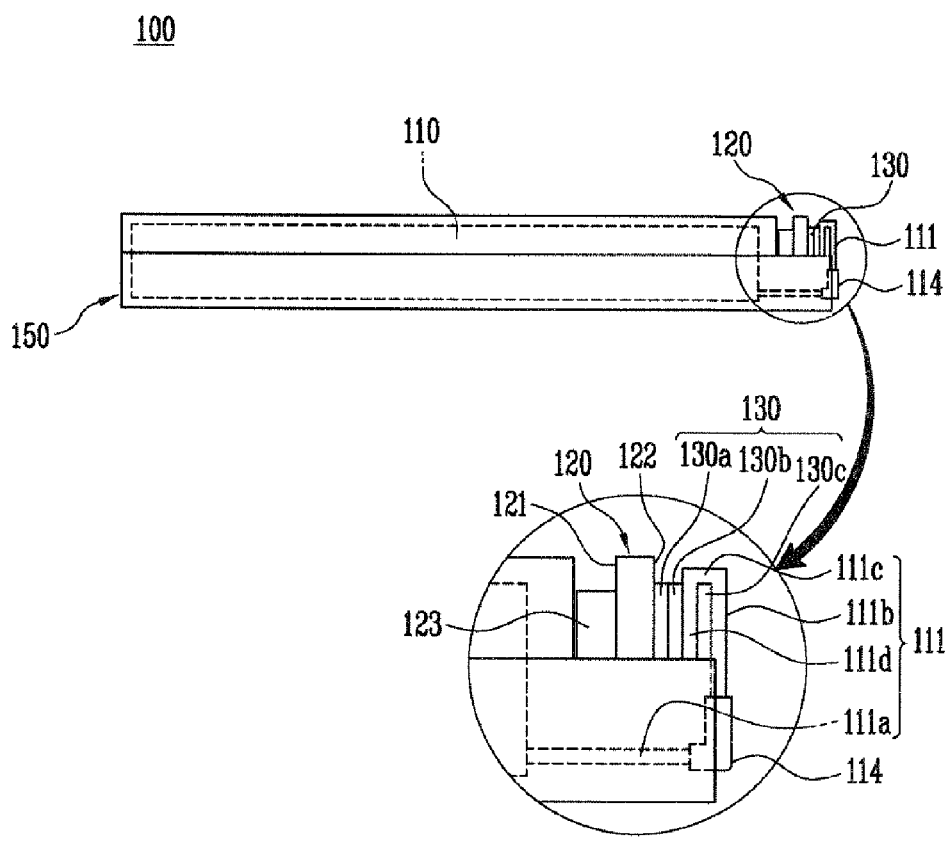

Next, as shown in FIG. 14, the electrode tab 111 may be bent once more by rotating the protective circuit module 120 to about 90 degrees (¼ cycle) in the second direction (S150).

In this case, the electrode tab 111 may be bent once more so as to be divided into not only the third and fourth regions 111c and 111d but also the second region 111b positioned on the third tab portion 130c and the first region 111a extracted horizontally from the bare cell 150. The protective circuit module 120 may be vertically positioned on the bare cell 150 by the rotation thereof, and accordingly, the first surface 121 of the protective circuit module 120 may face the surface to which the electrode tab 111 of the bare cell 150 may be extracted. The protective circuit module 120 may be mounted on the sealing portion 142 of the bare cell 150, so that the space can be efficiently occupied.

Meanwhile, although the processes of FIGS. 13 and 14 have been separately described in this embodiment, the present invention is not limited thereto. That is, the battery pack 100 may be manufactured by rotating the protective circuit module 120 to 270 degrees (¾ cycle) at a time in the state of FIG. 12. The processes of FIGS. 13 and 14 correspond to a step of placing the protective circuit module 120 with respect to the electrode assembly 110.

Accordingly, the battery pack 100 according to this embodiment, shown in FIG. 1, is manufactured through the manufacturing process described above.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack, comprising:
an electrode assembly having an electrode tab;
a protective circuit module having a first surface and a second surface opposite to the first surface, wherein the first surface is positioned to face a surface to which the electrode tab of the electrode assembly is extended; and
a connection tab positioned on the second surface of the protective circuit module with the electrode tab connected to the protective circuit module, the connection tab comprises:
a first tab portion positioned on the second surface of the protective circuit module;
a second tab portion extended from the first tab portion and bent at approximately a 180 degree angle toward the first tab portion; and
a third tab portion extended from the second tab portion and bent at approximately a 180 degree angle toward the second tab portion, at least a portion of the electrode tab is positioned between the second and third tab portions.

2. The battery pack according to claim 1, wherein the bending direction of the second tab portion and the bending direction of the third tab portion are perpendicular to each other.

3. The battery pack according to claim 1, wherein the first, second and third tab portions have the shape of a rectangular flat plate having two adjacent long sides and two adjacent short sides.

4. The battery pack according to claim 3, wherein the first and second tab portions are connected to each other between the two adjacent long sides, and the second and third tab portions are connected to each other between the two adjacent short sides.

5. The battery pack according to claim 1, wherein the first, second and third tab portions are all of equal size to one another.

6. The battery pack according to claim 1, wherein the electrode tab comprises:
a first region extended from the electrode assembly;
a second region bent from the first region so that at least a portion of the second region is positioned on the third tab portion;
a third region bent from the second region and positioned on a side corner of the third tab portion; and
a fourth region bent from the third region so that at least a portion of the fourth region is positioned between the second and third tab portions.

7. The battery pack according to claim 6, wherein the space between the fourth region of the electrode tab and the electrode assembly corresponds to the thickness of the protective circuit module.

8. The battery pack according to claim 1, wherein the connection tab includes nickel.

9. The battery pack according to claim 1, wherein the electrode assembly comprises:
   a first electrode plate;
   a second electrode plate;
   a separator interposed between the first and second electrode plates; and the electrode tab having first and second electrode tabs respectively connected to the first and second electrode plates.

10. The battery pack according to claim 1, further comprising a battery case that accommodates the electrode assembly, wherein a sealing portion is provided at an edge of the battery case.

11. The battery pack according to claim 10, wherein the battery case comprises a first sub-case and a second sub-case, an accommodating portion that accommodating the electrode assembly is provided to the first sub-case, and the second sub-case covers the first sub-case.

12. The battery pack according to claim 11, wherein the electrode tab is extracted through the sealing portion, and is bent so as to face the accommodating portion of the first sub-case at an end of the sealing portion.

13. The battery pack according to claim 11, wherein the first surface of the protective circuit module faces the accommodating portion of the first sub-case.

14. The battery pack according to claim 10, wherein the electrode tab is provided with a film, and the film is provided to be mounted on the sealing portion.

15. The battery pack according to claim 1, wherein the first, second and third tab portions have the shape of a rectangular flat plate having two adjacent long sides and two adjacent short sides.

16. The battery pack according to claim 15, wherein the first and second tab portions are connected to each other between the two adjacent long sides, and the second and third tab portions are connected to each other between the two adjacent short sides.

17. The battery pack according to claim 15, wherein the first, second and third tab portions are all of approximately equal size to one another.

18. The battery pack according to claim 1, wherein the electrode tab is bent a minimum of at least three distinct and separate times.

* * * * *